United States Patent [19]
Einhorn

[11] 3,920,210
[45] Nov. 18, 1975

[54] PIVOTABLE WALL BRACKET
[75] Inventor: Ruediger Einhorn, Katonah, N.Y.
[73] Assignee: Coats & Clark, Inc., New York, N.Y.
[22] Filed: Feb. 21, 1975
[21] Appl. No.: 551,602

[52] U.S. Cl. ............... 248/290; 248/304; 403/311
[51] Int. Cl.² .................... A47F 5/00; F16B 45/00
[58] Field of Search .......... 248/211, 213, 215, 227, 248/240, 240.1, 289, 290, 294, 301–308, 322, 217, 218; 403/311, 312

[56] References Cited
UNITED STATES PATENTS

| 123,699 | 2/1872 | Hubbard | 248/290 |
|---|---|---|---|
| 354,903 | 12/1886 | Hastings | 248/290 |
| 1,185,011 | 5/1916 | Sievert | 248/307 |
| 1,576,227 | 3/1926 | Rundle | 248/240 |
| 3,142,513 | 7/1964 | Skokut | 248/240 X |

FOREIGN PATENTS OR APPLICATIONS

| 5,081 | 5/1879 | Germany | 403/312 |
|---|---|---|---|
| 384,125 | 12/1932 | United Kingdom | 248/290 |

Primary Examiner—Roy D. Frazier
Assistant Examiner—Lawrence J. Staab
Attorney, Agent, or Firm—Burgess Ryan and Wayne

[57] ABSTRACT

A pivotable wall bracket has a base member adapted to be mounted on a wall, the base member having an upper and lower bearing. A base bracket is formed of a pair of matching bracket members adapted to clamp the bearing members and also to clamp a pair of dowels extending from the pivotal axis of the structure. A holder is formed of a pair of matching holder members which are fixed together to clamp the other end of the dowels. A ridge may be formed on the base to be engageable with one or more notches in the base bracket, to releasably hold the base bracket at determined angular displacements.

10 Claims, 9 Drawing Figures

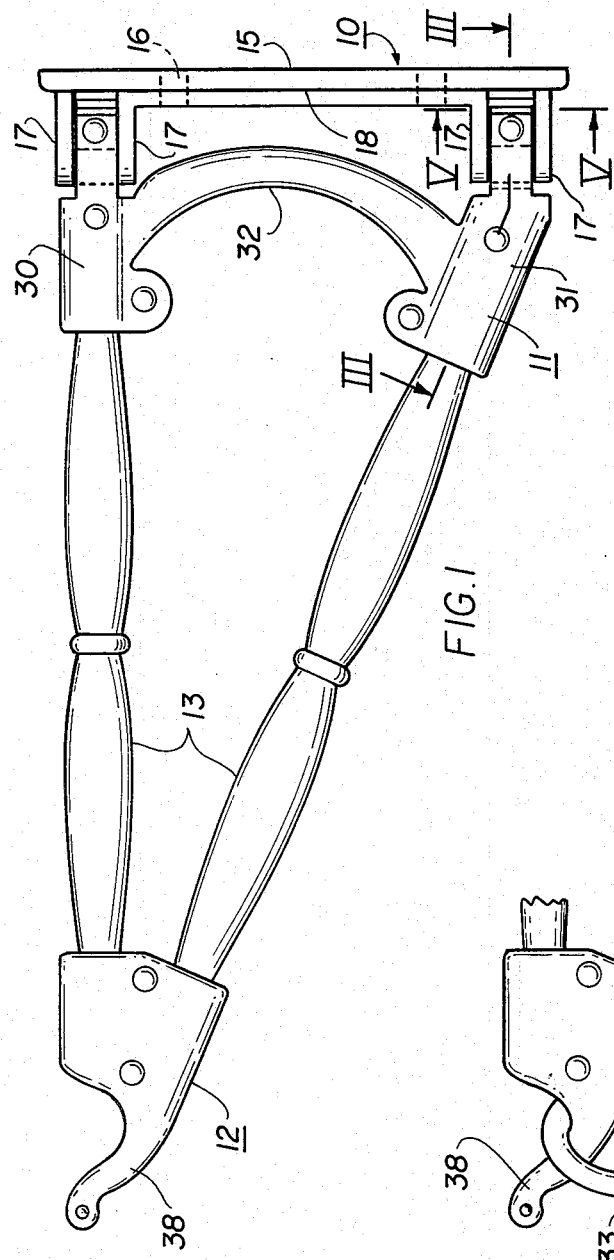
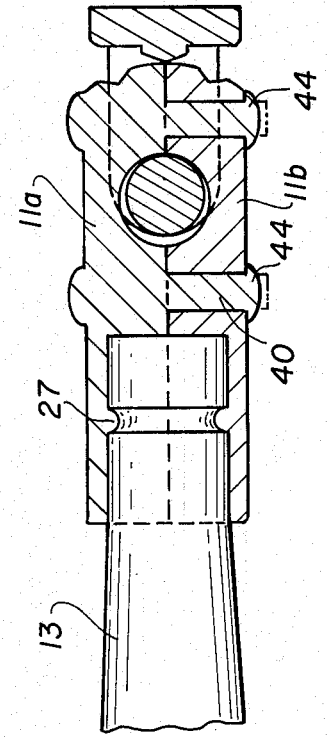
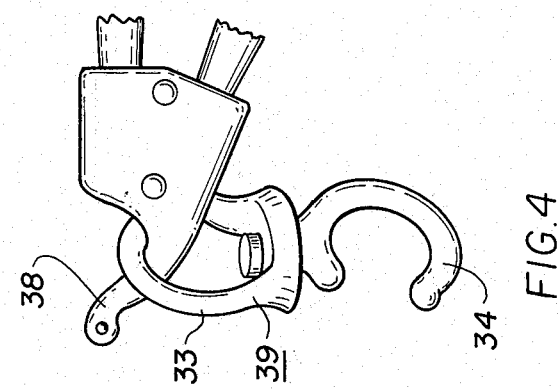

PIVOTABLE WALL BRACKET

This invention relates to wall brackets, and is particularly directed to the provision of a wall bracket of the type having a base member adapted to be affixed to a wall, and an arm member pivotably affixed to the base member and having a hook or the like for suspending an object.

Pivotable wall brackets have been known in the past, but generally such structures were substantially entirely functional in form, whereby they were not adaptable for use in many locations, or they were expensive to manufacture, so that their use, for example in homes, was limited.

The present invention is therefore directed to a pivotable wall bracket which is economical, and which may readily be provided with any desired ornamentation characteristics.

Briefly stated, the invention provides a wall bracket comprised of a base having a pair of bearings, a base bracket pivotably affixed to the bearings of the base member, a pair of dowels extending from the base bracket, and a holder, for example a hook, affixed to the outer ends of the dowels. In this structure, the base bracket and the holder are each formed on the pair of members that are substantially mirror images of each other, so that the members forming the base bracket serve to clamp the base bracket to the dowels and to the bearings of the base, and so that the members forming the holder clamp the other ends of the dowels and form the hook or the like for suspending an object.

It is preferable that the base, base bracket and hook be formed of a die casting metal, whereby any desired ornamentation feature may be cast into these members. For ornamental purposes, it is also preferable that the dowels be in the form of wood turnings. The cast members may, of course, be separately cast, with pins being provided on one element of each of the base bracket and holder, and aligned holes being provided in the other of the members of the base bracket and holder, so that the assembly may be clamped together by staking the ends of the pins.

In order that the invention will be more clearly understood, it will now be disclosed in greater detail, with reference to the accompanying drawings, wherein:

FIG. 1 is a side view of a pivotable wall bracket in accordance with the invention;

FIG. 3 is an enlarged cross-sectional view of a portion of the wall bracket of FIG. 1, taken along the lines III — III;

FIG. 4 is a partially perspective view of the hook of the wall bracket of FIG. 1, illustrating a swivel hook suspended therefrom;

Figure 2:
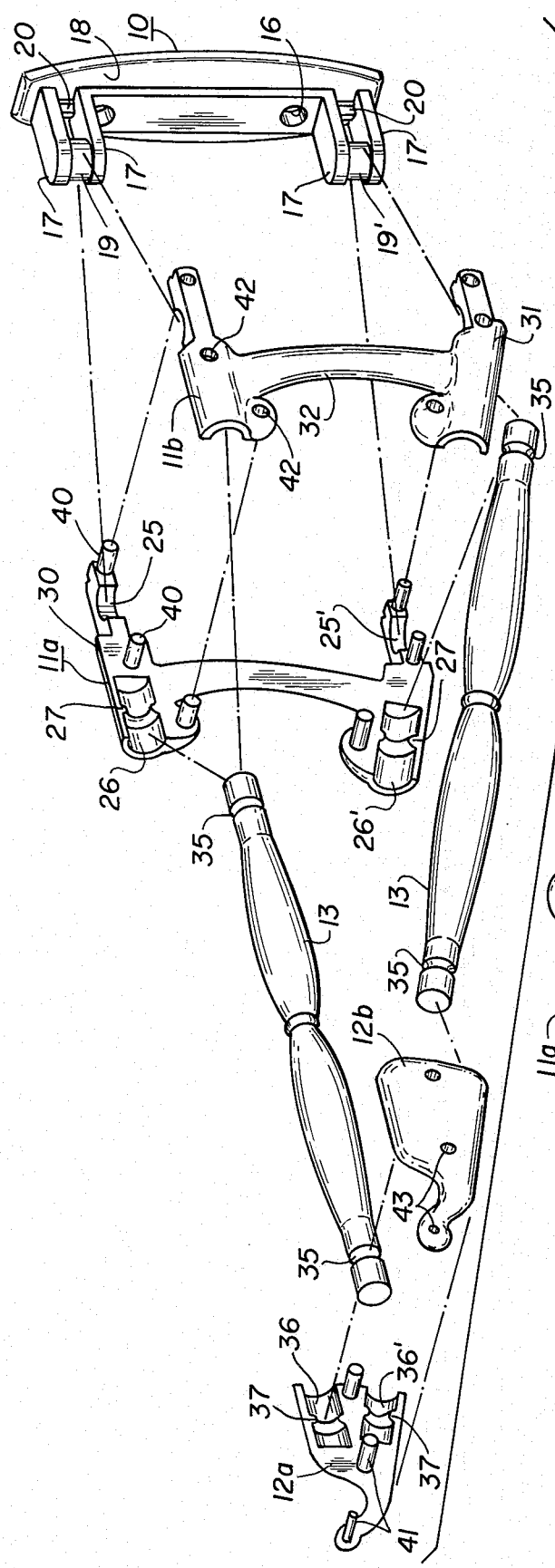
FIG. 2 is a perspective exploded view of the wall bracket of FIG. 1.
Figure 9:
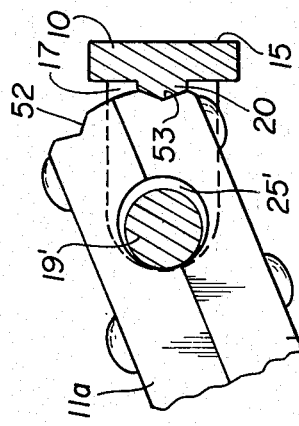
FIG. 9 is a partially cross-sectional view of a portion of the wall bracket of FIG. 1 at the lower bearing, illustrating the releasable action between the base bracket and the base member.

Referring now to the drawings, and more in particular to FIGS. 1 and 2, therein is illustrated a pivotable wall bracket in accordance with one embodiment of the invention. The wall bracket is comprised essentially of a base member 10, a base bracket 11, a holder 12, and a pair of dowels or rods 13, extending between the base and holder for supporting the latter.

The base member 10 has a wall-engaging surface 15, and may be provided with a plurality of holes 16 extending therethrough in order to enable the base to be affixed to a wall, for example, by means of screws (not shown). The base 10 is generally elongated, and has two pairs of projections 17, the pairs of projections preferably being disposed at opposite ends of the base. The projections 17 extend from the surface 18 of the base opposite the mounting surface 15, and bearings 19 and 19' extend between the projections at the upper and lower ends respectively of the base. The bearings 19 and 19' are preferably circular in cross section, and extend coaxially along an axis parallel to the wall mounting surface 15, and spaced from the surface 18 of the base.

As illustrated in the drawings, the projections 17, of each pair of such projections, have substantially parallel facing surfaces, and extend to completely cover or define the ends of the bearings. Further, the projections of each pair of projections 17 are spaced apart at the surface 18 of the base, and a ridge 20 is provided extending outwardly from the surface 20 between the pairs of projections 17. It will be apparent from the following description that, in the preferred embodiment of the invention, it is only necessary that the ridge 20 be provided between the projections of the lower pair of projections 17, although for facility in manufacture, and for appearances sake, a ridge 20 may be provided between each pair of projections 17. The function and shape of the ridges 20 will be described in greater detail in the following paragraphs.

As illustrated in FIGS. 2 and 3, the dowels or rods 13 may have circular cross-sections, and an angular groove 35 is provided adjacent each end of each of the dowels or rods 13. The dowels or rods 13 may be of equal length, in order to minimize manufacturing expense.

As illustrated more clearly in FIGS. 2 and 3, the base bracket is comprised of a pair of base bracket members 11a and 11b. With the exception of holding means, for affixing the members 11a and 11b together, the members 11a and 11b are substantially mirror images of each other. These members are fixed together, by means which will be disclosed in greater detail in the following paragraphs, to define an upper hole 25 surrounding the upper bearing 19, and a lower hole 25' surrounding the lower bearing 19'. Thus, in each of the bearing members 11a and 11b, the portion of the holes 25 and 25' defined thereby is semi-circular in cross section. Further, for purposes that will be discussed in the following paragraphs, the upper hole 25 preferably has a diameter that is slightly less than the diameter of the lower hole 25'.

The base bracket members 11a and 11b also define between them an upper recess 26 and a lower recess 26'. These recesses extend in a common plane defined by the axis of the holes 25, 25' and bearings 19 and 19'. The upper recess 26 preferably extends in a direction normal to the axis of the holes 25, 25', while the axis of the recess 26' preferably extends at a slight upward angle of the base bracket 11. A separate dowel or rod 13 is fitted into each of the recesses 26, 26', to extend in the common plane of the recesses. The recesses are provided with angular inwardly extending ridges 27, which engage the grooves 35 in one end of each of the dowels or rods, in order to firmly hold the dowels or rods in the base bracket. Considering the base bracket in a different sense, the bracket members 11a and 11b form an upper clamp 30 and a lower clamp 31 joined by a bridge 32. The upper clamp 30 defines the upper hole 25 and the upper recess 26, with the axis of the recess extending substantially perpendicular to the axis of the hole 25. The lower clamp 31 defines the hole 25', and the recess 26', with the recess 26' extending at an upward angle from the axis of the hole 25.

The holder 12 is formed of a pair of members 12a and 12b, as is shown most clearly in FIG. 2, these members, aside from the means for affixing them together, having substantially mirror image shapes. The members 12a and 12b define between them recesses 36 and 36', into which the outer ends of the dowels or rods 13 extend. The members 12a and 12b are provided with inwardly extending ridges 37 in the recesses 36 and 36', which engage the grooves 35 in the rods or clamps 13, in order to firmly hold the rods or clamps in the holder 12. The holder members 12a and 12b are also formed, at the end opposite the recesses therein, with a suitable shape for holding an object to be suspended. For example, as illustrated in FIGS. 1 and 2, the holder may be shaped to form a hook 38. As illustrated in FIG. 4, the hook may be employed, for example, to suspend a swivel hook 39, for example, of the type disclosed in copending application Ser. No. 549,313, filed Feb. 12, 1975. Such a swivel hook may have an upper loop portion 33 which may be mounted to engage hook 38, and a downwardly extending hook portion 34 pivotally mounted with respect to the upper portion 33.

The base 10, base bracket 11 and holder 12 are preferably formed by die casting, i.e., of a die cast metal. This method of forming the members of the bracket in accordance with the invention enables the provision of economically formed members which may have any desired ornamental features. In order to hold the base bracket members 11a and 11b together, and to hold the holder members 12a and 12b together, the base bracket member 11a may be provided with a plurality of pins 40 formed integrally therewith, and the holder member 12a may be provided with a plurality of pins 41 extending therefrom, and formed integrally therewith. In this arrangement, the joining surfaces of the members 11a and 11b, and the joining surfaces of the members 12a and 12b are preferably planar, with the pins 40 and 41 extending normal to the joining surfaces thereof. The other members 11b and 12b are provided with holes 42 and 43 respectively, extending transversely from the joining surfaces and aligned with the pins 40 and 41 respectively. The ends of the pins 40 and 41 extending through the opposite surfaces of the members 11b and 12b may be peened over, so that the members of the base bracket and the members of the holder are firmly held together. For example, FIG. 3 illustrates in dash lines the original shape of the ends of the pins 40, with the peened over or staked heads 44 being shown in solid lines.

With regard to placement of the pins and their aligned holes, as illustrated in FIG. 1, it is preferred that a pin-hole be provided adjacent each of the holes 25, 25', on the extreme ends of the base bracket toward the base 10, in order to firmly clamp the base bracket members around the bearings of the base. Further, it is preferred that a pin-hole combination be provided between each recess 26,26' and the adjacent hole 25,25', and that an additional pin-hole combination be provided adjacent the side of each of the recesses 26,26'. Further, it is preferred that a pin-hole combination be provided at the end of the hook 38, a further pin-hole combination be provided adjacent the inner ends of the recesses 36 and 36', and that a still further pin-hole combination be provided between the sides of the recesses 36 and 36'. With this arrangement of pins and aligned holes, when the pins are staked or peened over, the base bracket members and the holder members are firmly and rigidly held together, and clamp the bearings and the rods 13.

The rods 13 are preferably, although not necessarily, formed of wood turnings or molded plastic foam material, for ornamental reasons. Such turnings may be shaped to form any desirable appearance. It is, of course, preferable in this case, that the rods 13 have circular cross sections, although it will be apparent that other cross-sectional shapes may be employed, with the recesses into which the ends of the rods extend being shaped accordingly.

As discussed above, the bracket assembly in accordance with the invention is adapted to be affixed to a wall, and to suspend an object, the arm structure of the assembly being pivotable so that the object may be swung to any desired position. For example, the assembly in accordance with the invention may be employed to hang a pot containing a plant. In such cases, it may be on occasion desirable to swing the arm of the assembly to a position that is not normal with respect to the wall, but is still positioned so that the pot does not engage the wall. In such event, it is preferable that the arm of the assembly be provided with some means to releasably hold it at given angular positions.

Figure 5:
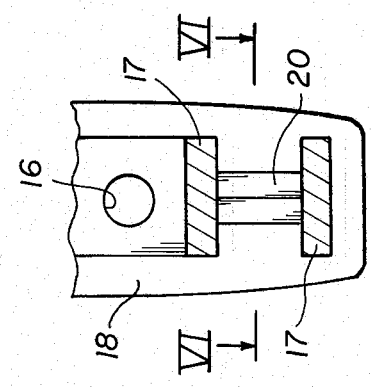
FIG. 5 is a cross-sectional view of a portion of the base of the wall bracket of FIG. 1, taken along the lines V — V.

As discussed above, with reference to FIG. 2, a ridge 20 was provided on the surface 18 of the base between the projections 17 at least at the lower end of the base. This ridge is more clearly illustrated in FIGS. 5 and 6, wherein it is seen that the ridge 20 extends parallel to the lower bearing 19', generally in the plane normal to the mounting surface 15 that passes through the axis of the bearing 19'. The ridge 20, as illustrated in FIG. 6, may have a base 50 at the surface 18, with a pair of inclined surfaces 51, joined at an angle of, for example, 140° to form the apex of the ridge.

Figures 6, 7, 8:
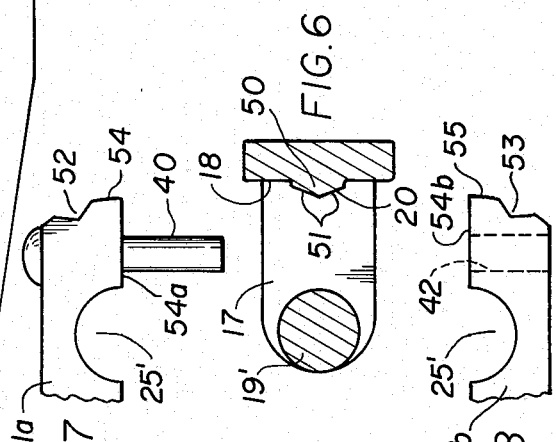
FIG. 6 is a cross-sectional view of the base, taken along the lines VI — VI of FIG. 5.
FIG. 7 is an enlarged top view of one end of one of the base bracket members of the wall bracket of FIG. 1.
FIG. 8 is a top view of a portion of the other of the members of the base bracket of the wall bracket of FIG. 1.

In addition, as illustrated in FIGS. 7 and 8, the ends of the base bracket members 11a and 11b are formed with notches to engage the ridge 20 at selected angular displacement of the arm. Thus, as shown in FIG. 7, a notch 52 is provided at the end of the member 11a, and in FIG. 8, a notch 53 is shown in the end of the member 11b. These notches may be displaced at any desired angle from the joining surfaces 54a and 54b of the members 11a and 11b, respectively. For example, in one embodiment of the invention, the centers of the notches 52 and 53 were at 22½° with respect to the surfaces 54a and 54b, respectively, taken about the axis of the hole 25'. The angle defined by the sides of the notches 52 and 53 is preferably equal to the angle between the inclined faces 51 of the ridge 20. The distance between the axis of the hole 25' and the end 54 of the member 11a, between the notch 52 and the surface 54a, in FIG. 7, is greater than the distance between the axis of the bearing 19' and the tip of the ridge 20, of FIG. 6, so that, when the arm in accordance with the invention, is rotated to align the notch 52 with the ridge 20, the ridge will slip into the notch to hold the arm at such aligned angular displacement. The diameter of the bearing 19' must, of course, be smaller than the inner diameter of the hole 25', in order to permit the ridge to engage the notch. At other smaller displacements of the arm assembly, the surface 54 will engage the end of the ridge 20. Similarly, the distance between the axis of the hole 25' and the surface 55 of the end of the bracket member 11b, between the notch 53 and the surface 54b, is also less than the distance between the axis of the bearing 19' and the apex of the ridge 20, for the same purpose. As discussed above, it is preferable that the lower hole 25' has a slightly larger diameter than that of the hole 25. This enables a slight tilting of the arm assembly, so that the arm may be releasably latched with the ridge 20 engaging either of the notches 52 or 53, while still having a reasonably tight bearing contact at the upper bearing 19. In one embodiment of the invention, the angular distance between the two notches 52 and 53 was about 45°. It is, of course, apparent that other angular distances may be employed, depending upon the desired positions at which the arm should be releasably held, and, if desired, additional notches may also be provided for the same purpose.

FIG. 8 thus illustrates the arm assembly displaced so that the ridge 20 engages the notch 53, this Figure showing the loose joint between the bearing 19' and the hole 25', which enables the locking action, but also permits the locking action to be released.

It is also apparent that the holes 25 and 25' may have the same diameter, in which case it is desirable that the bearing 19' have a somewhat smaller diameter than the bearing 19.

It is to be further noted, as illustrated in FIG. 7, that, with the base bracket member clamped to the base member, downward movement of the arm assembly is inhibited by the lower projection 17 of each pair of projections 17, while upward movement of the arm assembly is inhibited by the upper projection 17 of each pair.

While the invention has been disclosed and described with reference to a single embodiment, it is apparent that many variations and modifications may be made therein, and it is intended in the following claims to cover each such variation and modification as falls within the true spirit and scope of the invention.

What is claimed is:

1. A pivotable wall bracket comprising a unitary base member having a wall-engaging surface, first and second pairs of projections extending from a surface of said base member opposite said wall-engaging surface, and first and second bearing members extending between the projections of said first and second pairs of projections, respectively, said bearing members having substantially circular cross sections and being substantially axially aligned, the axis thereof parallel to and spaced from said wall-engaging surface, first and second dowels each having an annular groove in its surface adjacent each end thereof, a base bracket comprised of a pair of base bracket members having substantially mirror image shapes and affixed together to define between them first and second bearing holes surrounding said first and second bearing members, respectively, and first and second recesses into which one end of said first and second dowels, respectively, extend in a common plane defined by said axis, said first and second recesses having ridges extending into said grooves to prevent removal of said dowels therefrom, and a holder comprised of a pair of holder members having substantially mirror image shapes and affixed together and defining between them third and fourth recesses into which the other ends of said first and second dowels, respectively, extend, and an end portion adapted to suspend an object, each of said third and fourth recesses having portions extending into the grooves at the respective ends of said dowels extending thereinto, to firmly hold said dowels in said bracket and holder member.

2. The wall bracket of claim 1, wherein one of said base bracket members and one of said holder members have pins projecting therefrom into and through aligned holes in the other of said base bracket member and holder members, respectively, the ends of said pins being staked to firmly hold said base bracket members together and said holder members together.

3. The wall bracket of claim 1, wherein said base member, base bracket members and holder members are of a die casting material.

4. The wall bracket of claim 3, wherein said dowels are wood turnings.

5. The wall bracket of claim 1, wherein said first dowel extends normal to said wall-engaging surface, the axis of said first dowel extending through said first bearing member, and wherein said second dowel is positioned below said first dowel, and extends upwardly from said base bracket to said holder.

6. The wall bracket of claim 1, wherein said end portion of said holder members is shaped as a hook.

7. The wall bracket of claim 1, wherein said base bracket members have upper portions defining a first clamp for clamping said base bracket to said first dowel and said first bearing member, and a second clamp for clamping said second dowel and said second bearing member, each of said base bracket members having semi-circular recesses defining portions of said bearing holes, and semi-circular recesses defining portions of said first and second recesses.

8. The wall bracket of claim 1, wherein said base member further comprises a ridge extending from said opposite surface between the projections of said second pair of projections and parallel to said second bearing member, said second pair of projections being lower than said first pair of projections, said base bracket having at least one notch positioned to engage said ridge at a predetermined angular displacement of said base bracket with respect to said base member, said second bearing hole having an inner diameter greater than the outer diameter of said second bearing member.

9. The wall bracket of claim 8, wherein said second bearing hole has a larger diameter than said first bearing hole, and said first and second bearings have substantially the same diameter.

10. The wall bracket of claim 3, wherein said dowels are of a molded plastic material.

* * * * *